Nov. 10, 1959   J. O. BLIXRUD   2,912,127
DISTRIBUTING MEANS
Filed Aug. 20, 1956

INVENTOR.
JOHN O. BLIXRUD
BY
ATTORNEY

United States Patent Office 2,912,127
Patented Nov. 10, 1959

2,912,127

DISTRIBUTING MEANS

John O. Blixrud, Park Forest, Ill., assignor to General Mills, Inc., a corporation of Delaware Application August 20, 1956, Serial No. 605,003

2 Claims. (Cl. 214—17)

This invention relates to the distribution of granular material, puffed cereal or the like in a feeding bin. More specifically the invention relates to a rotary disc for distributing the granular material as it is fed into the bin.

Granular material, such as puffed cereal, may be substantially uniform in size as it is conveyed to a bin, but the individual particles are likely to vary in density, with some particles being heavier than others.

When the material is fed into a bin through an opening in the bin, a conical shaped pile of the granular material may be formed directly under the granular material inlet. With the particles varying in density, there is a likelihood of the heavier particles to collecting outwardly of relative center of the bin and the lighter particles collecting at other portions of the bin.

It is a practice to feed by gravity from the bottom of a bin filled with granular material, and in so doing it is advantageous to feed a substantially uniform mixture of heavy and light particles, particularly where the package being filled from the bin is controlled on a weight-volume basis. In such case it is desirable to have granular material fed into the package until its desired weight is obtained, and that the granular material will occupy substantially the same volume from package to package.

In fact multiple package feeding may occur from a single bin, and if the heavy particles are not satisfactorily mixed with the lighter particles in the bin, then there is a likelihood that one package may be filled with largely heavy particles whereas another package may be filled with light particles, resulting in the granular material occupying different volumes in the respective packages.

It is therefore an object of my invention to provide a distributing means within a bin for more uniformly distributing the granular material as it is fed into the bin.

It is another object of my invention to provide a rotating inclined disc subjacent the granular material entering the bin for distributing the granular material within the bin.

It is a further object of my invention to provide a means for distributing granular material within a bin to allow the granular material to form a pile having its upper portion concave in cross-section.

It is an additional object of my invention to provide for the storage of granular material in a bin so that granular material fed from said bin will comply with predetermined volume-weight ratios desirable in economical packaging of the granular material.

These and other objects will appear in the following description and drawings, of which:

Figure 2:
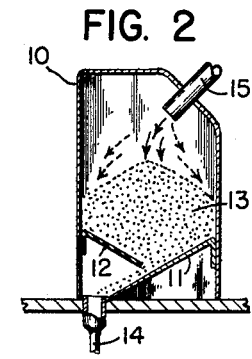
Fig. 2 is a section taken at 2—2 of Fig. 1.
Figure 1:
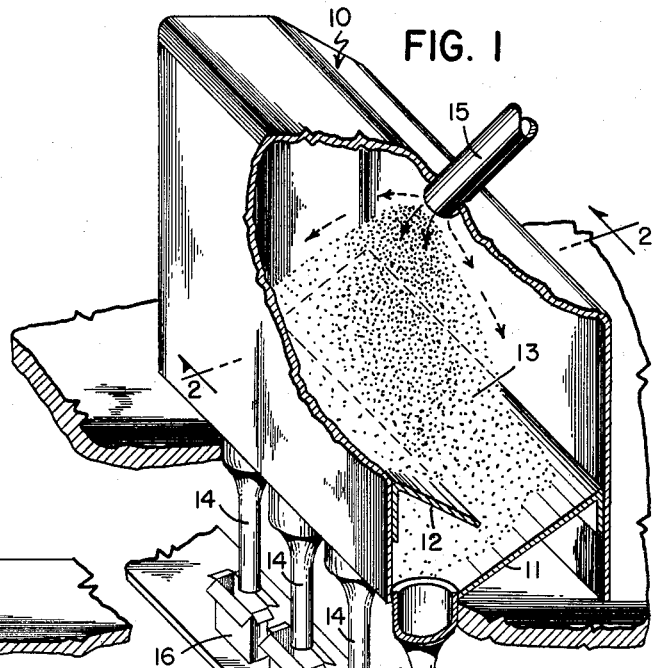
Figure 1 is an isometric view of filling a bin without the distributing device of my invention.

Referring now to Fig. 1, a bin 10 is provided with inclined bottom portions 11 and 12 with bottom portion 12 serving as both a retainer and baffle for the feeding of granular material 13 into filler pipes 14. Granular material is introduced by gravity into bin 10 through tubular inlet 15 as shown in Fig. 1 and Fig. 2 tends to form a conically shaped pile. It can be seen that the particles entering at tube 15 and having different densities will assume various positions on the surface of the conical pile and within the pile. For example, there is a likelihood that the heavier particles will gravitate toward the central bottom portions and outwardly of the conical pile while the lighter particles will tend to move to other portions of the conical pile and bin. The granular material is fed by gravity through filler tubes 14 into packages 16. The mechanism for controlling the weight-volume filling ratio of these packages is not part of the present invention and need not be described further. It is important to note only that with grain being fed by gravity into a conical pile that there is the likelihood of low density concentration and high density concentration affecting the resultant volume content of the packages being filled from the bin. The packages are shown placed on a conveyor 17 and as the packages are filled, new packages are brought along the conveyor and placed adjacent the end of filler tubes 14 for a continuation of the package filling, but such conveyor is not part of the present invention and need not be further described.

Figure 3:
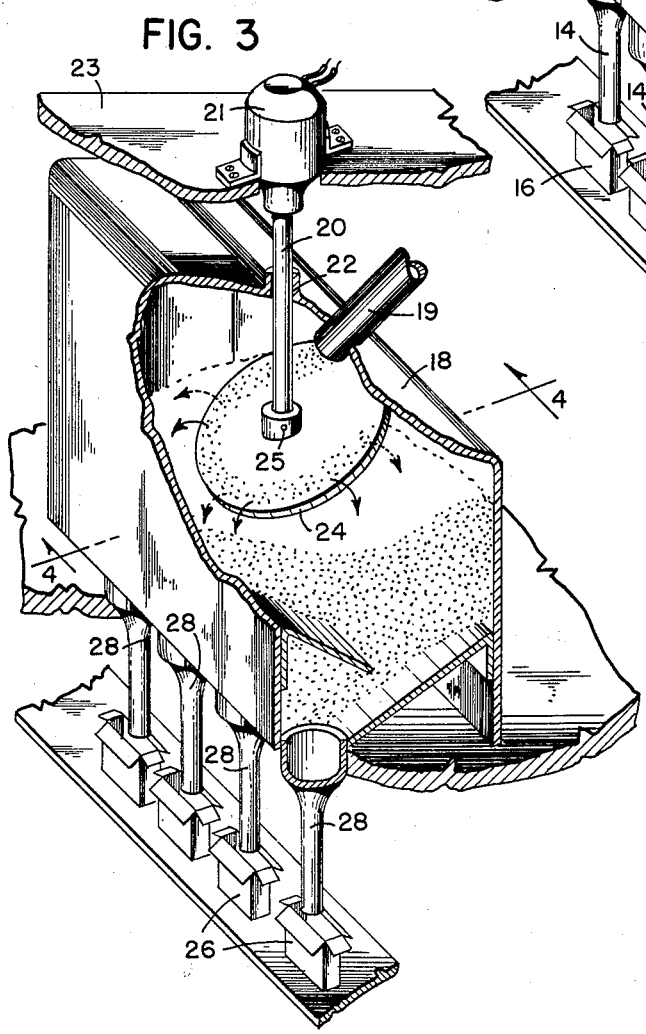
Fig. 3 is an isometric view of a bin provided with the distributing device of my invention.

In Fig. 3 the bin 18 is provided with a filler tube 19 for entry of the granular material into the bin. Additionally, a shaft 20 is connected to a motor 21 and the shaft is located in the bin through an opening 22. The motor is shown mounted on a plate or platform 23 which is not necessarily a part of the bin structure. Mounted on the shaft 20 within the bin is a circular disc plate 24 fixed to the shaft 20 as by set screw 25. The disc or plate 24 is inclined at approximately an angle of 60° from the vertical line of the shaft 20, and the shaft and disc are rotated by the motor 21 in the particular embodiment at approximately 10 r.p.m.

Figure 4:
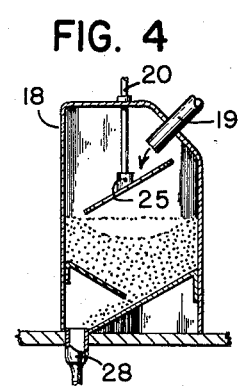
Fig. 4 is a sectional view taken at 4—4 of Fig. 3.

The filling of bin 18 is as follows: the granular material enters the bin 18 through a feed tube 19, as by gravity, and as the particles leave the end of the tube 19 they fall upon the inclined rotating disc 24 in such manner that the particles tend to flow to the lower portions of the disc where they are moved radially outwardly from the periphery of the disc by the action of the disc. The disc 24 rotates slowly so that as the granular material strikes the disc 24 at the upper portion thereof it tends to move by gravity down the incline of the disc so that it can be said that the grain is actually thrown from the inclined disc 24 at the lower portion thereof. The pattern formed by the granular material leaving the disc 24 is depressed or concave in cross section as shown in Fig. 4.

Thus it can be understood that the rotating disc 24 prevents the formation of a conical pile subjacent the inlet tube 19. The disadvantages of conical piling are eliminated, and by means of the rotating disc 24, the concave or centrally depressed piling as shown in Figs. 3 and 4 is formed, with the high and low density particles in a more homogeneous relationship. Thus when the granular material is gravity fed through filler tubes 28, the packages 26 on conveyor 27 are more uniformly filled from a weight-volume ratio aspect.

As an example of the actual embodiment of my invention, the disc 24 is approximately 4 foot in diameter and is affixed to the end of shaft 20 at an angle of approximately 60° with the shaft. The shaft is driven by motor 21 at approximately 10 r.p.m. The bin in which the rotating disc is mounted is approximately 6 x 12 x 10 feet.

Thus I have described an inclined rotating disc distributor means for more uniformly distributing in a bin granular material consisting of varying amounts of high and low density particles, whereby particles fed from the bin are of a more uniform mixture of high and low density particles to maintain a substantially constant weight volume ratio at the packages into which the granular material is fed. Other means or variations of the disclosed distributing means may be found to fall within the scope of my invention, and I intend to be limited only by the scope of the appended claims.

I claim as my invention:

1. In combination, a bin having sides for containing and feeding cereal particles, an inlet and an outlet in said bin, a shaft means mounted for rotation on said bin and extending into said bin, an inclined disc mounted on said shaft means and inclined thereto and rotatable therewith for distributing cereal particles entering at said inlet, means for continuously rotating said shaft means and disc in a fixed position in said bin, whereby the cereal particles strike said rotating inclined disc and are discharged from the edge thereof by combined centrifugal and sliding action so that a greater number of particles fall near the sides of said bin than in the center portion of said bin.

2. In a bin for feeding high and low density particles in substantially constant weight volume ratio, the combination including, an inlet for admitting said high and low density particles to said bin, rotating means including an inclined disc rotatable within said bin, said particles admitted at said inlet being carried by gravity to strike said rotating inclined disc, an outlet in said bin for the discharge of said particles, whereby the particles are distributed from said inclined disc at the edges thereof by combined centrifugal and gravitational force to substantially mix said high and low density particles within the bin so that substantial homogeneity of particles is obtained at said outlet.

References Cited in the file of this patent

UNITED STATES PATENTS

| | | |
|---|---|---|
| 886,672 | Baker | May 5, 1908 |
| 1,564,546 | Evans | Dec. 8, 1925 |